(12) United States Patent
Atkin et al.

(10) Patent No.: US 7,886,309 B2
(45) Date of Patent: *Feb. 8, 2011

(54) ACCESSING A PLATFORM INDEPENDENT INPUT METHOD EDITOR FROM AN UNDERLYING OPERATING SYSTEM

(75) Inventors: Steven E. Atkin, Austin, TX (US); Laszlo C. Benedek, Richmond Hill (CA); Baldev S. Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 11/963,805

(22) Filed: Dec. 22, 2007

(65) Prior Publication Data

US 2008/0148290 A1 Jun. 19, 2008

Related U.S. Application Data

(62) Division of application No. 10/733,934, filed on Dec. 10, 2003, now Pat. No. 7,383,553.

(30) Foreign Application Priority Data

May 15, 2003 (CA) .................................. 2428821

(51) Int. Cl.
*G06F 13/00* (2006.01)
(52) U.S. Cl. ...................................... 719/321; 719/327
(58) Field of Classification Search ................. 719/321, 719/327
See application file for complete search history.

(56) References Cited

U.S. PATENT DOCUMENTS

| | | | |
|---|---|---|---|
| 6,003,050 A | 12/1999 | Silver et al. |
| 6,349,344 B1 | 2/2002 | Sauntry et al. |
| 6,493,735 B1 | 12/2002 | Kumhyr |
| 6,675,371 B1 | 1/2004 | York et al. |
| 6,874,146 B1 | 3/2005 | Iyengar |
| 7,096,224 B2 | 8/2006 | Murthy et al. |
| 2002/0083216 A1 | 6/2002 | Hickson et al. |

*Primary Examiner*—Andy Ho
(74) *Attorney, Agent, or Firm*—Yee & Associates, P.C.; David A. Mims, Jr.

(57) ABSTRACT

The invention relates to access to a platform independent input method editor or IME from an underlying operating system. Keystrokes received at an operating system input may be formed into a character sequence, and an operating system-based IME service module may call the platform independent IME to convert the character sequence to a corresponding code point. The transferred code point may then be returned to an operating system output.

16 Claims, 8 Drawing Sheets

ACCESSING A PLATFORM INDEPENDENT INPUT METHOD EDITOR FROM AN UNDERLYING OPERATING SYSTEM

This application is a divisional of Ser. No. 10/733,934, filed Dec. 10, 2003, U.S. Pat. No. 7,383,553, issued on Jun. 3, 2008.

BACKGROUND OF THE INVENTION

The field of the invention is data processing, and more specifically relates to accessing a platform independent input method editor ("IME") from an underlying operating system.

An IME is a software program which interprets user operations, such as typing keys, speaking, or writing using a pen device, to generate text input. For example, an IME may allow a user to type a sequence of keystrokes on a regular English (United States) keyboard to form complex characters found in languages such as Chinese, Japanese, or Korean. The IME uses a character encoding format to associate the user's keystrokes with a "code point", and the code point with a formed character or "glyph" (i.e. the actual writing mark normally associated with the code point).

Over the years, many character encoding formats have been developed. One example is the American Standard Code for Information Interchange, commonly known as "ASCII." ASCII allows characters to be represented by numbers. For example, if the encoding format is decimal, the glyph 'A' in ASCII corresponds to '65'. Other character encoding formats include "EBCDIC" (Extended Binary-Coded Decimal Interchange Code) developed by IBM, "CCITT" developed by the International Telegraph and Telephone Consultative Committee (now known as the International Telecommunication Union), and "ISO 8859-1" developed by the International Organization for Standardization.

More recently, the "Unicode" encoding format, developed by the Unicode Consortium, has been gaining wider acceptance. Unicode is touted as an "international" character encoding format with enough resolution to notionally provide a unique numeric value or code point for every character, independent of the platform, program, and language. Unicode has been widely adopted in Internet browsers, and is supported in modern platform independent programming languages, such as Java (discussed further below).

In the Unicode encoding system, each character receives a unique Unicode code point having a value in the hexadecimal range 000000 to 10FFFF. Thus, each Unicode code point may be expressed using 21 bits. (There are, however, several Unicode encoding format standards in use: UTF-8, UTF-16, and UTF-32. UTF-8 represents Unicode code points in "code units" of 8 bits. UTF-16 represents Unicode code points in code units of 16 bits. UTF-32 represents Unicode code points in code units of 32 bits. In UTF-32, each Unicode code point is stored in a single code unit.)

Readers interested in more detail regarding Unicode or multi-code unit Unicode encoding formats are directed to "The Unicode Standard, Version 3.0," ISBN 0-201-61633-5, by the Unicode Consortium.

As known to those skilled in the art, Java is an object-oriented language able to express a software program in terms of objects (i.e., software bundles of related variables and methods), classes, inheritances, interfaces, and so on. In order to enable a Java application to execute on different types of data processing systems, a code compiler generates an architecture-neutral file format, and then the compiled code is executed on the data processing system within a Java Virtual Machine ("JVM"). With full support for Unicode, Java is well suited for developing platform independent, multilingual software programs, such as Java-based IMEs.

To interface with Java-based IMEs, a Java Input Method Framework ("IMF") may be used. As known to those skilled in the art, the Java IMF provides a standard set of application user interfaces ("APIs") for use in developing Java applications. For example, the Java IMF may be used to cooperate with the Java-based IME to provide a way to display a character composition to a user. In a first approach, the Java IMF may enable text editing components to display text in the context of the document that it will eventually belong to, but in a style, such as highlighted or underscored, that indicates that the text still needs to be converted or confirmed by the Java-based IME. This first approach is called "on-the-spot editing". In a second approach, the Java IMF may provide a separate window to display text for applications not equipped to deal with the text, until it is confirmed and officially handed over to the application. This second approach is called "root-window editing".

Readers interested in more detail regarding Java-based IMEs and the Java IMF are directed to the "Input Method Framework Design Specification" published by Sun Microsystems, Inc.

Heretofore, IME developers have had to create both platform independent IMEs, and operating system specific versions of those IMEs, as required. It would be desirable to provide a more efficient solution.

SUMMARY OF THE INVENTION

The invention provides access to a platform independent input method editor or IME from an underlying operating system. Keystrokes received at an operating system input may be formed into a character sequence, and an operating system-based IME service module may call the platform independent IME to convert the character sequence to a corresponding code point. The transferred code point may then be returned to an operating system output.

The keystrokes may be converted to a first encoding format for allowing editing of the keystrokes in an active input control, and for forming the character sequence. The character sequence may then be converted to a second encoding format compatible with the platform independent IME.

The platform independent IME may be a Java-based Unicode IME, and the underlying operating system may be a Microsoft Windows™ operating system, such as Windows XP Professional™ or Windows 2000™. The IME service module may run on a Windows Service Manager and call a Java character handling method or routine to convert the character sequence into one or more Unicode characters. In an embodiment, an IME device driver running on a Windows Input Method Manager (IMM) may be connected to the IME service module, and provide the IME service module with the character sequence.

In an aspect of the invention, there is provided a method of accessing a platform independent input method editor (IME) from an underlying operating system, comprising:

(i) receiving keystrokes at an operating system-based input;

(ii) forming a character sequence from said received keystrokes;

(iii) from an operating system-based IME service module, calling said platform independent IME to convert said character sequence to a corresponding code point;

(iv) transferring said code point to an operating system-based output.

In another aspect of the invention, there is provided a system for accessing a platform independent input method editor (IME) from an underlying operating system, comprising:

an operating system-based input for receiving keystrokes from a user;

an operating system-based IME service module for receiving a character sequence formed from said keystrokes, and for calling said platform independent IME to convert said character sequence to a corresponding code point;

an operating system-based output for outputting said code point.

In another aspect of the invention, there is provided a system for accessing a platform independent input method editor (IME) from an underlying operating system, comprising:

an operating system based input means for receiving keystrokes from a user;

an operating system based means for receiving a character sequence formed from said keystrokes;

an operating system based means for calling said platform independent IME to convert said character sequence to a corresponding code point; and an operating system based output means for outputting said code point.

In another aspect of the invention, there is provided a computer program product for providing access to a platform independent input method editor (IME) from an underlying operating system, the computer program product comprising:

a computer usable medium having computer readable program code means embodied in the medium for providing access to a platform independent IME from an underlying operating system, the computer program code means including:

computer readable program code means for receiving keystrokes at an operating system based input;

computer readable program codes means for forming a character sequence from received keystrokes;

computer readable program code means for calling, from an operating system based IME service module, said platform independent IME to convert said character sequence to a corresponding code point; and computer readable program code means for transferring said code point to an operating system based output.

The foregoing and other aspects of the invention will be apparent from the following more particular descriptions of exemplary embodiments of the invention.

DETAILED DESCRIPTION OF EXEMPLARY EMBODIMENTS

Figure 1:
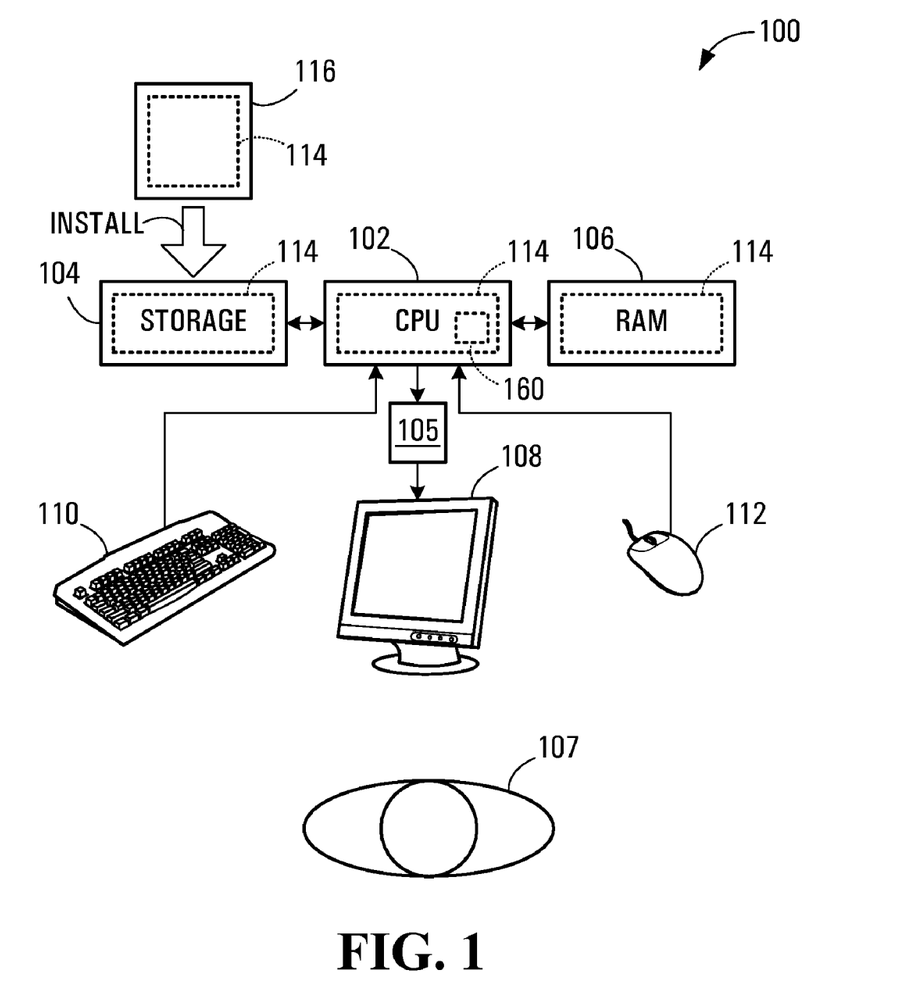
FIG. 1 shows a schematic block diagram of an illustrative data processing system that may provide an operating environment for exemplary embodiments of the invention.

Referring to FIG. 1, shown is an exemplary data processing system 100 that may provide an operating environment for exemplary embodiments of the invention. The data processing system 100 may include a central processing unit ("CPU") 102 connected to a storage unit 104 and to a random access memory ("RAM") 106. A user 107 may interact with the data processing system 100 using a video display 108, and various inputs such as a keyboard 110 and mouse 112. Various other inputs, such as touch screens and touch screen pens (not shown), may also be used. The data processing system 100 of FIG. 1 is illustrative and not meant to be limiting in terms of the type of data processing system that may provide a suitable operating environment for the invention.

In the exemplary embodiment, the data processing system 100 may be a personal computer running a Microsoft Windows™ operating system, such as Windows XP Professional™ or Windows 2000™.

Still referring to FIG. 1, the invention may be embodied in a computer software program product 116 containing computer software 114 (schematically represented in dotted outline) that may be installed onto storage 104, loaded into RAM 106, and executed on CPU 102. The software program 114 executing on CPU 102 may provide an output via a display driver 105 to the video display 108. The user 107 may provide input to the software program 114 via the keyboard 110 and mouse 112.

Figure 2:
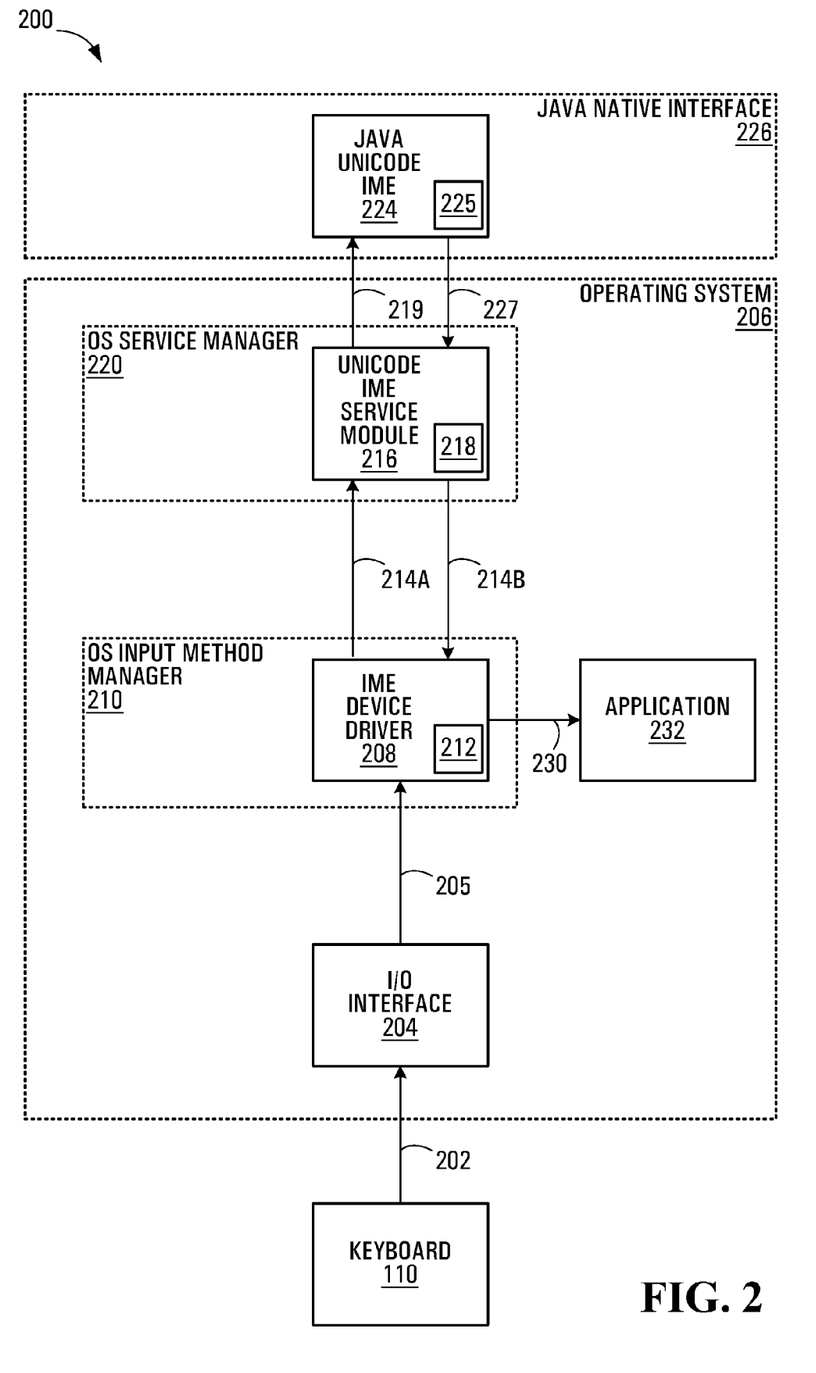
FIG. 2 shows a schematic block diagram of an exemplary embodiment of the invention.

Referring to FIG. 2, shown is a schematic block diagram of an exemplary embodiment of the invention. In FIG. 2, a keyboard 110 allows a user 107 to enter an alphanumeric key, or a series of alphanumeric keys, that represents a desired character. In an embodiment, the keys may be entered at an operating system input such as, for example, an active input control of an application running on the operating system.

In the exemplary embodiment, keystrokes entered by a user at the keyboard 110 (or at any other suitable input device) are passed via link 202 and received by an I/O interface 204 in the operating system 206. In an embodiment, the keystrokes may be passed to an IME device driver 208 via link 205. As shown, the IME device driver 208 may run on an operating system-based input method manager 210, such as the Windows Input Method Manager ("IMM") in a Microsoft Windows operating system.

In the exemplary embodiment, a temporary buffer 212 is associated with the IME device driver 208. The buffer 212 may allow keystrokes entered by the user to be stored in the form of virtual keys. The IME device driver 208 may then send a character sequence to the IME service module 216, via a path 214a. (A return path 214b is shown from the IME service module 216 to the IME device driver 208.) Collectively, the paths 214a/214b form an inter-process connection 214. In an embodiment, the inter-process connection 214 may be a virtual connection, such as a named pipe. In various other embodiments, the inter-process connection 214 may be configured as shared memory, shared files, or any other suitable form of inter-process communication.

In the exemplary embodiment, the character sequence sent to the IME service module 216 is ASCII. ASCII may be chosen, for example, as it is an efficient encoding format for English language keyboards. However, it will be appreciated by those skilled in the art that any suitable character encoding format may be used, such as EBCDIC and Unicode, depending on the particular keyboard configuration. In another embodiment, the IME service module 216 may run on an operating system-based service manager 220, such as the Windows Service Manager in a Microsoft Windows operating system.

In the exemplary embodiment, the IME service module 216 receives the ASCII character sequence via the inter-process connection 214 and converts each character in the character sequence to its corresponding Unicode equivalent. The conversion to the Unicode encoding format is based on compatibility with the encoding format used by the platform independent IME, which in the exemplary embodiment is a Java-based Unicode IME. A temporary buffer 218 may be associated with the IME service module 216 to temporarily store the Unicode equivalents.

In the exemplary embodiment, the Java-based IME object 224, running in a JVM, may be accessed by the IME service module 216 via a Java Native Interface 226. As will be explained in further detail below, the Java-based IME 224 may receive, at 219, code units from the IME service module 216, and convert those code units into Unicode code points associated with formed characters or glyphs. These converted Unicode code points may be temporarily stored in a temporary buffer 225, and then returned, at 227, to the IME service module 216.

As shown in the exemplary embodiment, the IME service module 216 may then return, via the inter-process connection 214, the Unicode code point to the IME device driver 208.

The Unicode code point received by the IME device driver 208 may then be transferred, as shown at 230, to an operating system output, provided for example in the application 232, for incorporation or display of the associated Unicode character or glyph.

An exemplary method according to an embodiment of the invention, and which corresponds to the embodiment of FIG. 2 is now described.

Figure 3A:
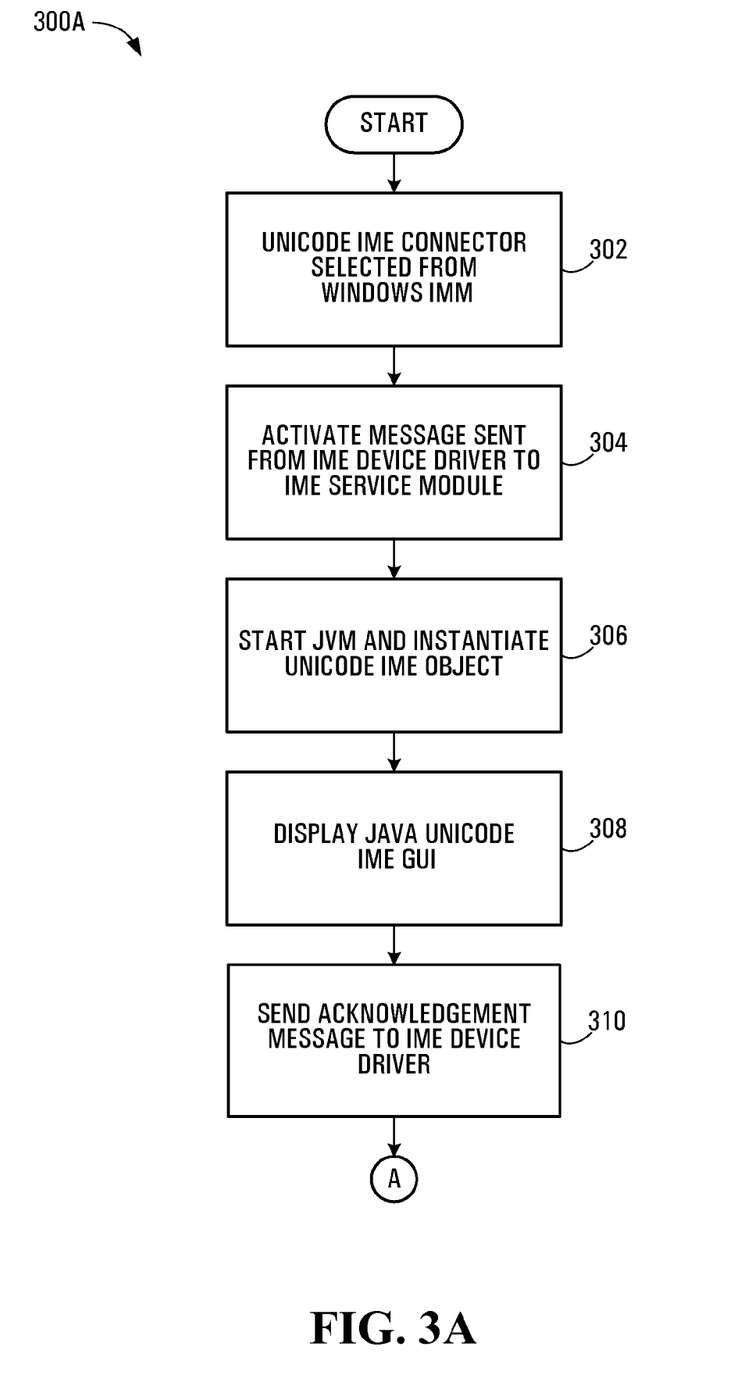
FIG. 3A shows a schematic flowchart of an activation method for the embodiment of FIG. 2.

Referring to FIG. 3A, shown and generally referenced as 300A is an illustrative activation method for activating the Java-based IME 224 of FIG. 2. The activation method 300A starts and proceeds to block 302, at which the user 107 may select the Java-based IME 224 from an operating system input method manager. For example, the Java-based IME 224 may be selected from the Windows IMM referred to above, using a Windows keyboard toolbar. From block 302, the activation method 300A proceeds to block 304, at which an "activate" message is sent from the IME device driver 208 to the IME service module 216 via the inter-process connection 214. The activation method 300A then proceeds to block 306, at which the IME service module 216 starts the JVM in a thread and instantiates the Java-based IME 224. The activation method 300A then proceeds to block 308, at which the Java-based IME 224 may be displayed, for example, via a user interface 108. The activation method 300A then proceeds to block 310, at which the IME service module 216 sends an acknowledgment message back to the IME device driver 208, using the inter-process connection 214. The activation method 300A then proceeds to block 330 in FIG. 3C.

Figure 3B:
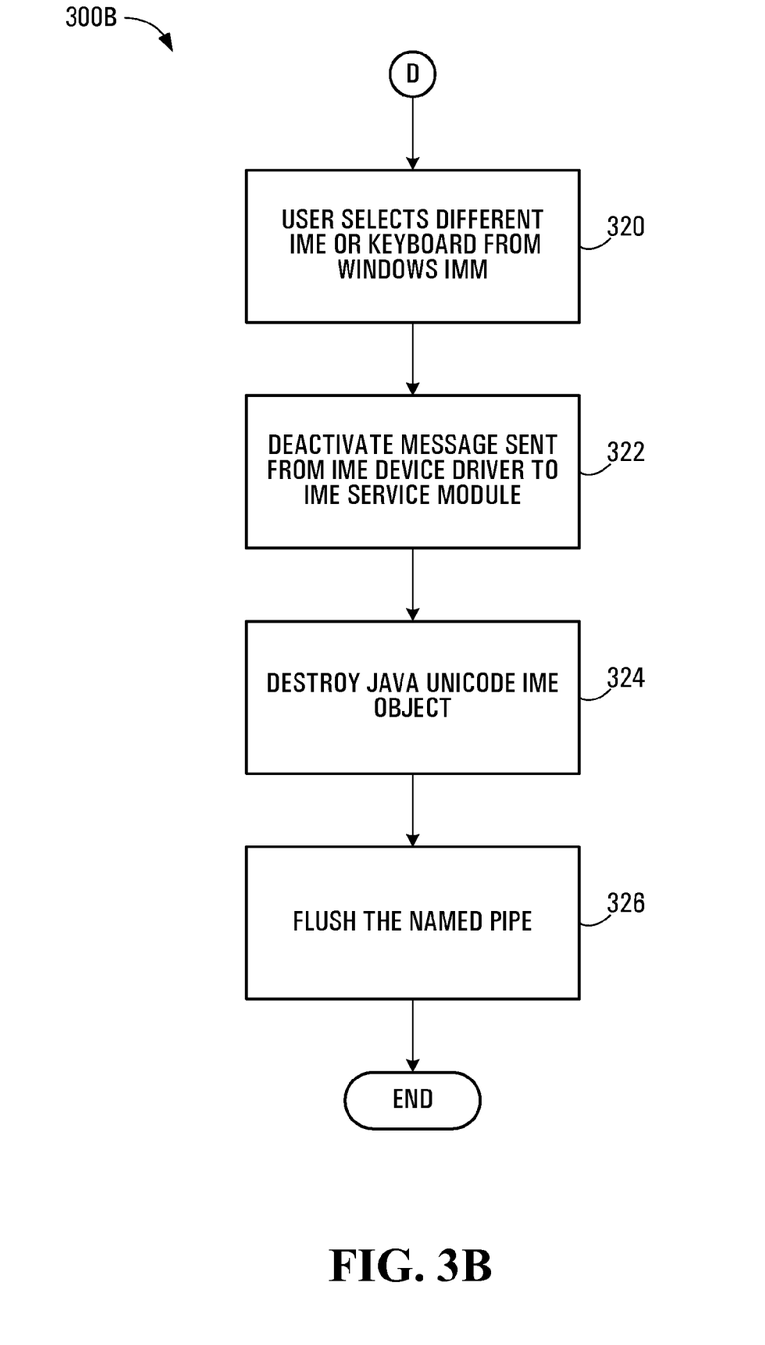
FIG. 3B shows a schematic flowchart of a deactivation method for the embodiment of FIG. 2.

Referring to FIG. 3B, shown and generally referenced as 300B is an illustrative deactivation method for deactivating the Java-based IME 224 of FIG. 2. The deactivation method 300B begins and proceeds to block 320, at which the user 107 may select a different IME or keyboard from the Windows IMM. From block 320, the deactivation method 300B proceeds to block 322, at which the Unicode IME device driver 208 sends a "deactivate" message to the IME service module 216 via the inter-process connection 214. The deactivation method 300B then proceeds to block 324, at which the IME service module 216 destroys the Java IME object 224, and stops the JVM. The deactivation method 300B then proceeds to block 326, at which the IME service module 216 flushes the inter-process connection 214. The deactivation method 300B then ends.

Figure 3C:
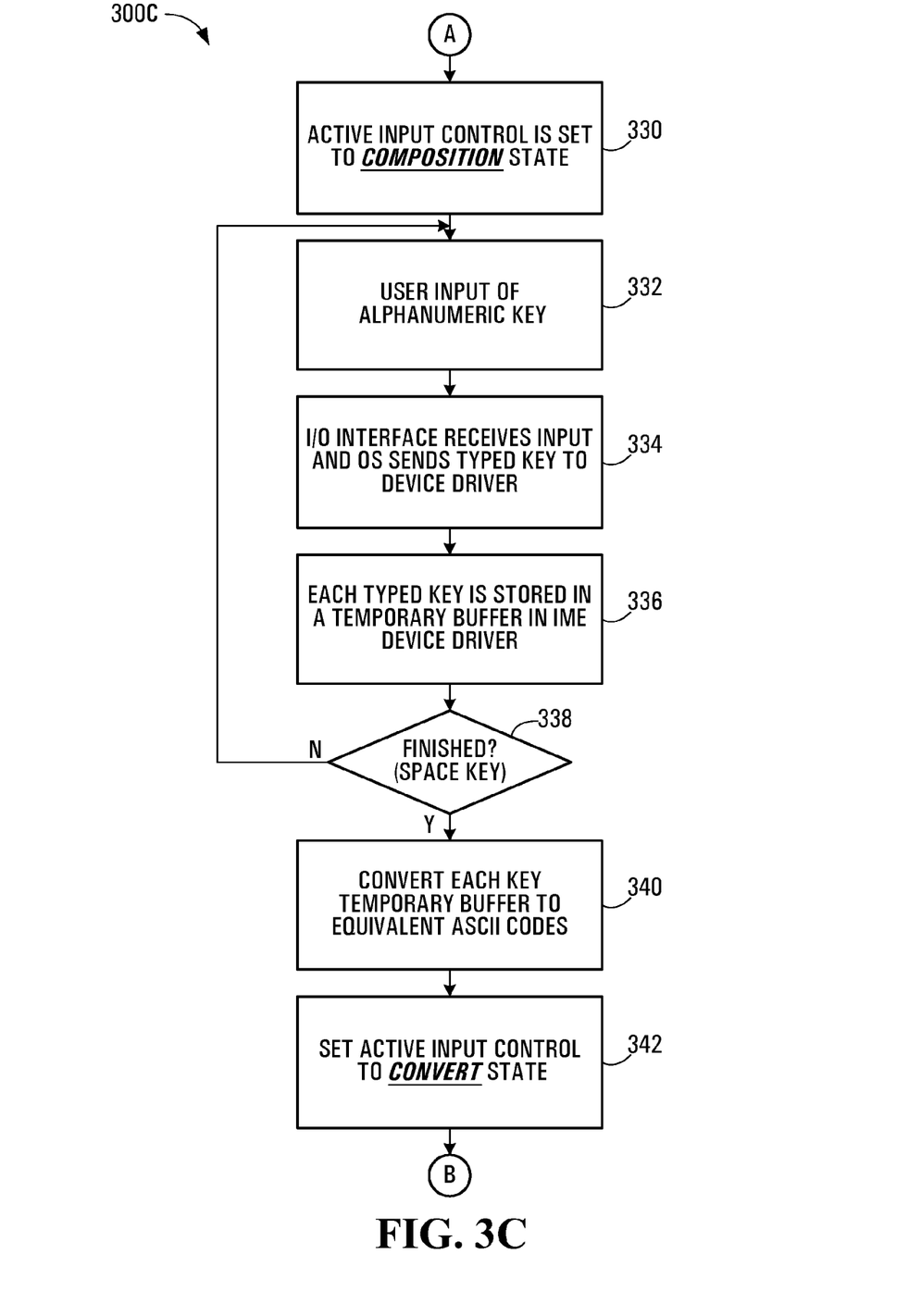
FIGS. 3C-3E shows a schematic flow-chart of an exemplary method corresponding to the embodiment of FIG. 2.
Figure 3D:
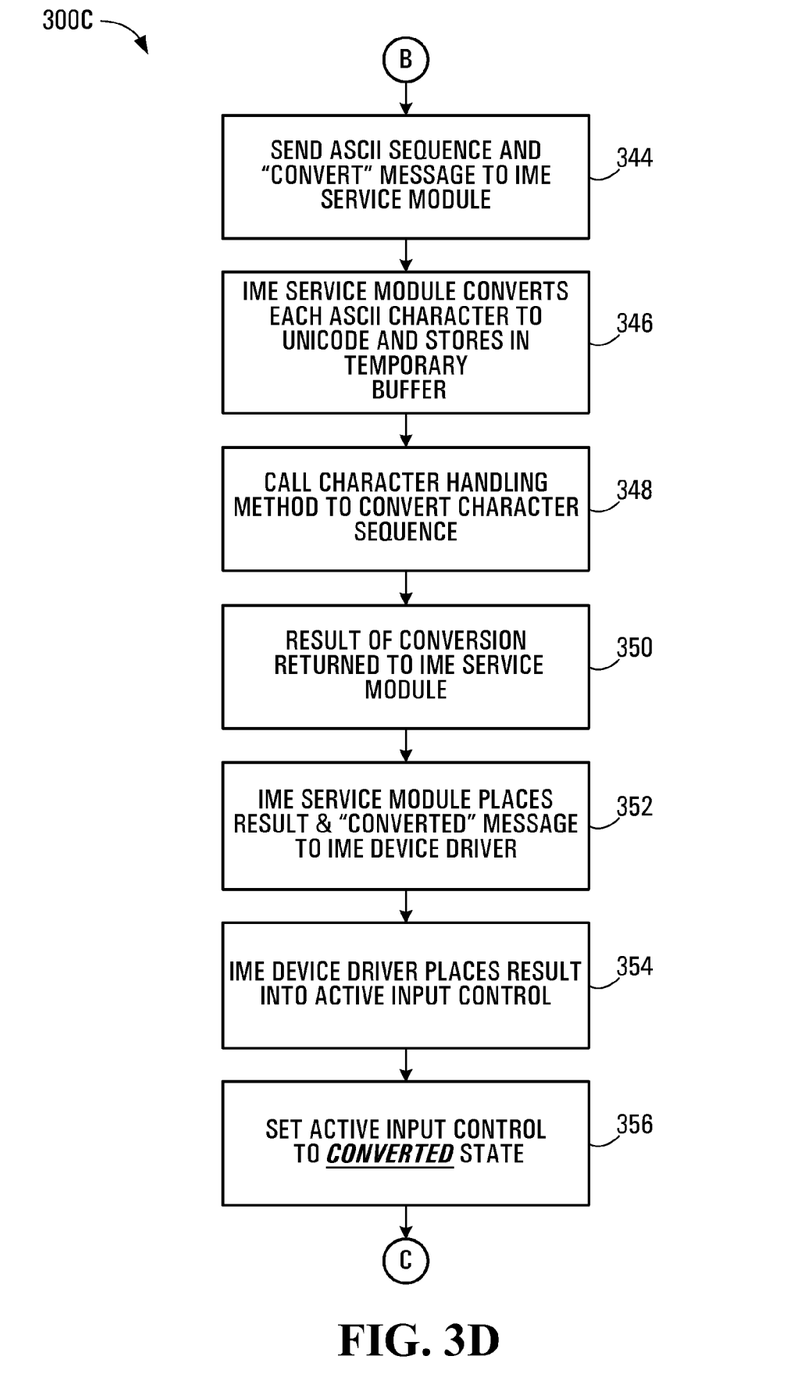
Figure 3E:
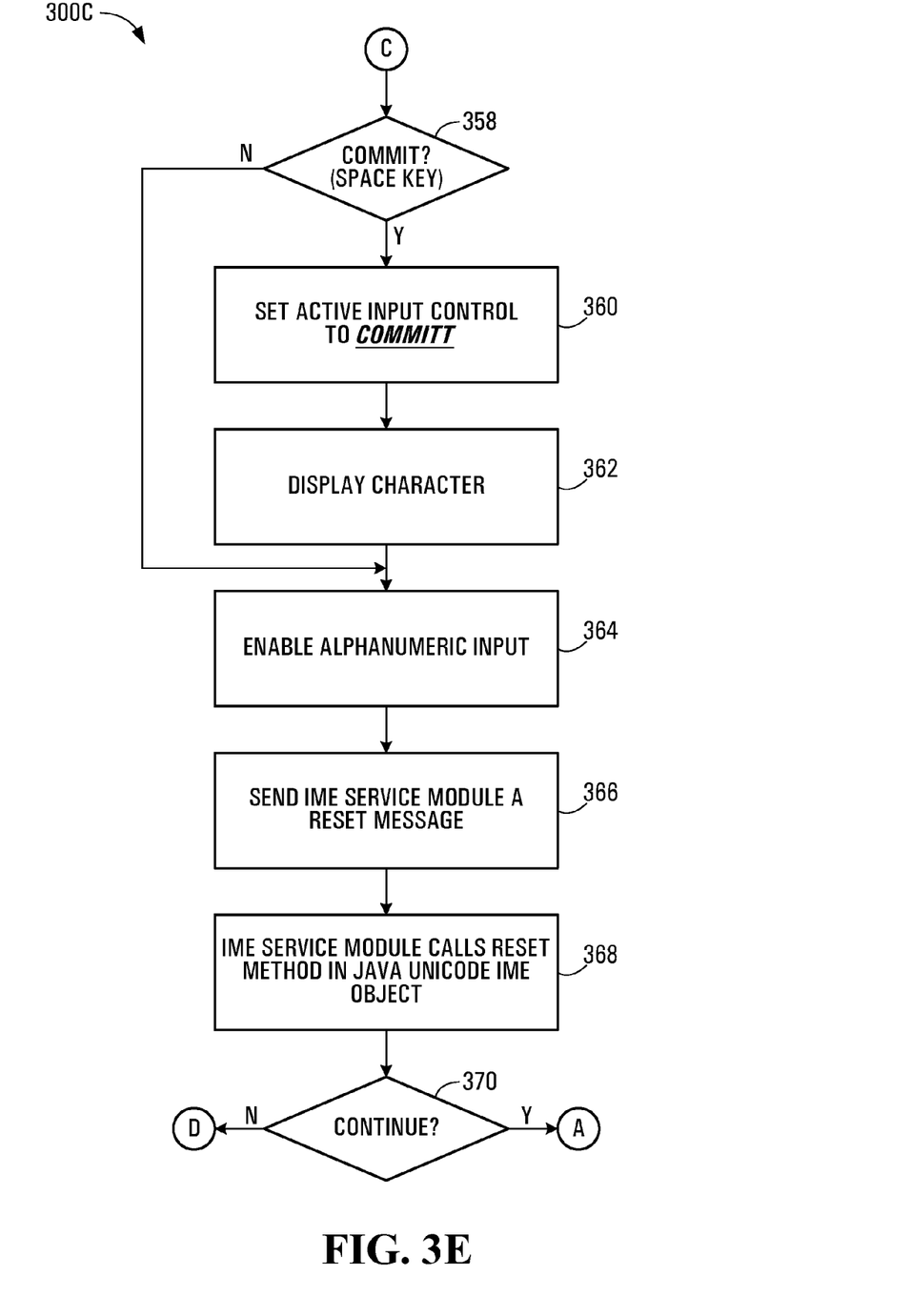

Now referring collectively to FIGS. 3C-3E, shown is an exemplary method 300C corresponding to the embodiment of FIG. 2. Method 300C begins at block 330 at which, with the Java-based IME 224 activated (FIG. 3A), an active input control associated with the application 232 is set to a COMPOSITION state. Method 300C then proceeds to block 332, at which the user 107 may input an alphanumeric key at keyboard 110. Typically, the alphanumeric key may be represented as a hexadecimal or decimal digit. To indicate the COMPOSITION state, the user typed alphanumeric keys may be represented on display 108, for example, by underlining.

Method 300C then proceeds to block 334, at which the I/O interface 204 receives the user typed alphanumeric key and forwards a "virtual" key to the IME device driver 208.

The method 300C then proceeds to block 336, at which each virtual key is received by the IME device driver 208 and may be stored in the associated temporary buffer 212.

Method 300C then proceeds to decision block 338, at which method 300C may wait for the user 107 to press a predetermined special key indicating the end of a sequence of alphanumeric keys. For example, in an embodiment, the user 107 may press the "space" key to indicate that the user 107 has finished typing a sequence of alphanumeric keys. Until the user 107 has indicated the end of a sequence in the predetermined manner, method 300C may return to block 332 to continue to receive user input alphanumeric keys. However, upon receiving the indication of the end of the sequence, method 300C proceeds to block 340. At block 340, the IME device driver 208 may convert the sequence of virtual keys stored in the temporary buffer 212 to equivalent ASCII codes. In an embodiment, the ASCII encoding format may be selected, for example, for its efficiency in encoding keys from English language keyboards. It will be appreciated by those skilled in the art that other suitable encoding formats may be selected, such as EBCDIC or Unicode, depending on the particular keyboard configuration.

Method 300C then proceeds to block 342, at which the IME device driver 208 may set the state of the active input control in the application 232 to a CONVERT state. For example, in an embodiment, the CONVERT state may be represented by the ASCII character sequence appearing in reverse video on display 108. At the same time, the IME device driver 208 may temporarily disable further alphanumeric input by the user 107, for the duration of the conversion function.

Method 300C then proceeds to block 344 in FIG. 3D. At block 344, the IME device driver 208 may send the ASCII character sequence and a "convert" message to the IME service module 216, via the inter-process connection 214. Method 300C may then proceed to block 346 at which the IME service module 216 takes the ASCII character sequence, and converts each ASCII character to its corresponding Unicode equivalent, creating a Unicode equivalent character sequence. The converted Unicode equivalent character sequence may then be stored in the associated temporary buffer 218. At this point, the Unicode equivalent character sequence stored in the temporary buffer 218 is still just a character sequence, and has not yet been converted to a Unicode code point for a formed character in a language such as Chinese, Japanese or Korean, for example.

Method 300C then proceeds to block 348, at which the IME service module 216 may call a Java IME "character handling" method 349, via the Java Native Interface 226, to handle the actual conversion of the character sequence to a Unicode character. An illustrative example of a very basic Java IME character handling method 349 is shown in FIG. 3F.

Figure 3F:
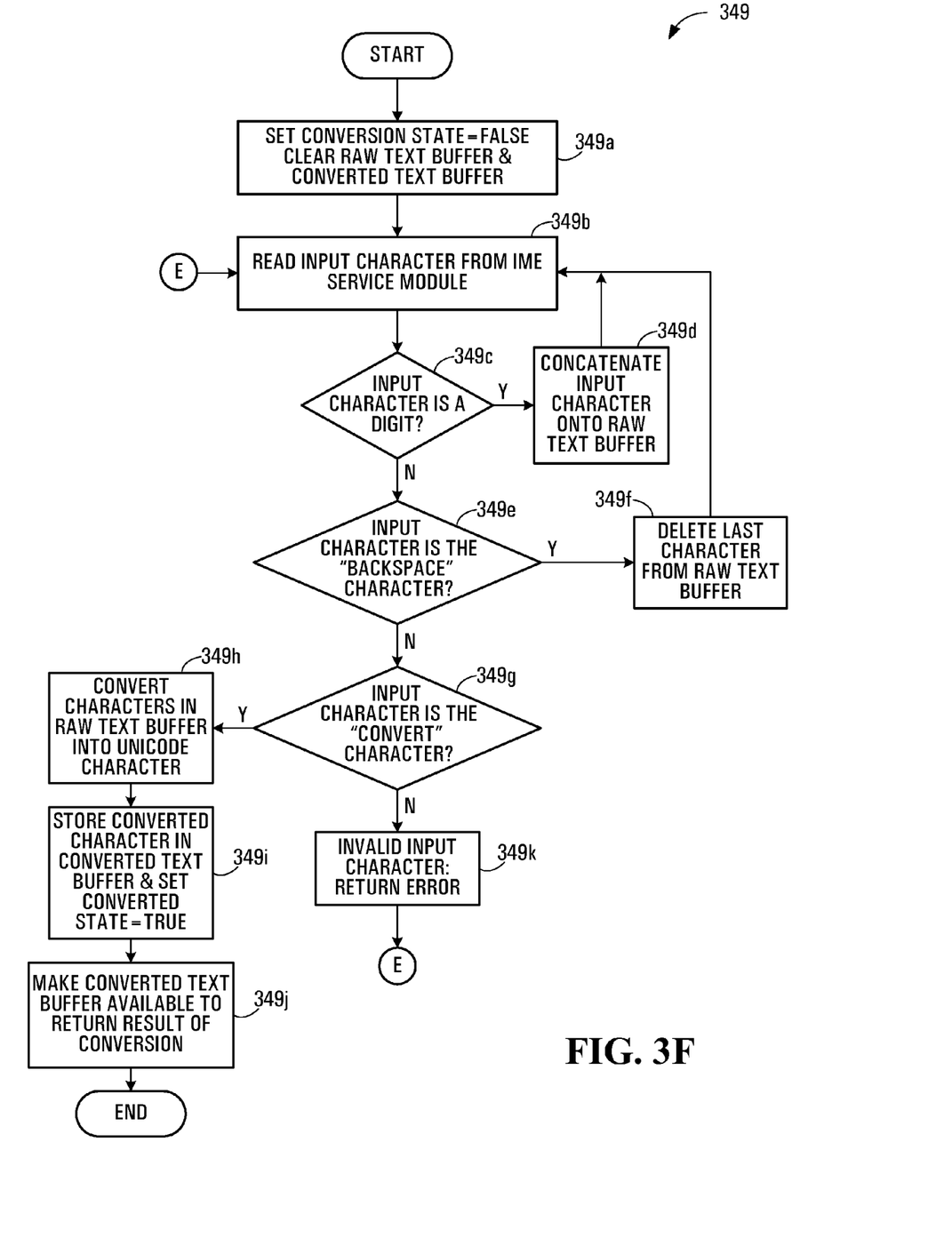
FIG. 3F is a schematic flow-chart of an exemplary character handling method which may be called from the method of FIGS. 3C-3E.

As shown in FIG. 3F, at block 349a, the Java IME character handling method 349 may define, for example, certain variables and resources including a "Conversion State" variable, a "Raw Text" buffer, and a "Converted Text" buffer. The initial state for the Conversion State may be set to "False", and the Raw Text buffer and the Converted Text buffer may both be cleared. In an embodiment, both the Raw Text buffer and the Converted Text buffer may be provided in the temporary buffer 225 of the Java-based IME 224.

The Java IME character handling method 349 may then proceed to block 349b, at which the character handling method 349 may read an input character received from the IME service module 216.

At decision block 349c, if the input character received from the IME service module 216 is a digit, then the character handling method 349 proceeds to block 349d, at which the character handling method 349 concatenates the input character onto the Raw Text buffer. The character handling method 349 then loops back to block 349b to read the next input character received from the IME service module 216.

At decision block 349e, if the input character is the "backspace" character, the character handling method 349 proceeds to block 349f, at which the last character concatenated onto the Raw Text buffer is deleted. Character handling method 349 then returns to block 349b.

At decision block 349g, if the input character is the CONVERT character (e.g., the "space" character described earlier), then the character handling method 349 proceeds to block 349h and converts the concatenated characters in the Raw_Text buffer into an actual Unicode "code point". As discussed above, a Unicode "code point" may have an associated formed character or "glyph" which may be displayed (e.g. a formed Chinese, Japanese, or Korean character). At block 349i, the converted Unicode code point is stored in the Converted Text buffer, and the Converted State is set to True. The character handling method 349 then proceeds to block 349j at which the contents of the Converted Text buffer are made available to return the results of the conversion, i.e. the Unicode code points, to the IME service module 216.

If an invalid input character was read at block 349b, then at block 349k, a suitable error indication may be returned by the character handling method 349.

As will be apparent to those skilled in the art, the above described "character handling" method is a rudimentary example, and it will be appreciated that a more robust character handling method may take its place, depending on the IME used.

Returning to FIG. 3D, the method 300C then proceeds to block 350, at which the converted Unicode code point may be returned to the IME service module 216 via the Java Native Interface 226. Method 300C then proceeds to block 352, at which the IME service module 216 receives the Unicode code point, along with a "converted" message, and returns the Unicode code point to the IME device driver 208. Method 300C then proceeds to block 354, at which the IME device driver 208 may transfer the Unicode code point to the application 232, for display at an operating system output. At block 356, the state of the active input control is set to CONVERTED.

Method 300C then proceeds via link C to decision block 358 in FIG. 3E. At decision block 358, method 300C may wait for the user 107 to enter another predetermined, special key to indicate that the displayed Unicode character corresponding to the Unicode code point should be committed. For example, the user 107 may again press the "space" key to indicate that the Unicode IME device driver 208 should now set the state of the active input control to COMMITT, as shown at block 360. At block 362, once committed, the Unicode formed character (i.e. the glyph corresponding to the Unicode code point) may appear in normal font. Also, at block 364, the Unicode IME device driver 208 may re-enable the alphanumeric input to allow further input of alphanumeric keys from the user 107.

Method 300C then proceeds to block 366, at which the IME device driver 208 sends the IME service module 216 a "reset" message via the inter-process connection 214. Method 300C then proceeds to block 368, at which the IME service module 216 may call a Java "reset" method or routine in the Java IME 224.

Finally, method 300C proceeds to block 370, at which method 300C may either return via link A to block 330 for further user input, or proceed via link D to block 320 (FIG. 3B) to deactivate the Java-based IME 224.

It will be understood from the foregoing description that various modifications and changes may be made, and in fact will be made, in the exemplary embodiments of the invention without departing from its true spirit.

For example, in the illustrative embodiment, a system comprising both an IME device driver, and an IME service module has been described. Those skilled in the art will appreciate that this two-part system may facilitate improved usability, for example, by providing feedback to a user via a display as keystrokes are entered, and allowing the user to correct the keystrokes before submitting the keystrokes to the platform independent IME for conversion to a code point. However, in an alternative embodiment, it will be appreciated that the functions may be combined in a single process or module.

As another example, while a Java-based IME has been described, it will be appreciated that the teachings of the present invention may be extended to cover any platform independent IME which may be called by an operating system based IME service module.

Also, in the exemplary embodiment described above, the keys entered at the keyboard have been described as being alphanumeric. However, it will be appreciated that the keys may be other than alphanumeric, depending on the particular keyboard configuration and language the user is using.

Also, while the Java-based IME has been described as using the Unicode encoding system, it will be appreciated that any other suitable encoding system may be used.

Furthermore, while the operating system of the exemplary embodiment is a Windows operating system, it will be appreciated that various other suitable operating systems may be used such as, for example, the Linux operating system.

The descriptions in this specification are for purposes of illustration only and are not to be construed in a limiting sense. Therefore, the scope of the invention is limited only by the language of the following claims.

The embodiments of the invention in which an exclusive property or privilege is claimed are defined as follows:

1. A system for accessing a platform independent input method editor (IME) from an underlying operating system, comprising:

an operating system-based input for receiving keystrokes from a user;

an operating system-based device driver for forming a character sequence from the received keystrokes, the character sequence being rendered as a desired character;

an operating system-based IME service module for receiving the character sequence formed from said keystrokes, and for calling said platform independent IME to convert said character sequence to a corresponding code point, the code point being a value assigned to the desired character in an encoding format specification; and an operating system-based output for outputting said code point.

2. The system of claim 1, wherein said operating system-based input comprises an active input control in an application running on said operating system.

3. The system of claim 2, wherein the operating system-based device driver transfers said character sequence to said operating system-based IME service module.

4. The system of claim 3, wherein said operating system-based device driver is configured to convert said received keystrokes to a first encoding format suitable for editing said keystrokes at said active input control.

5. The system of claim 4, wherein said operating system-based IME service module is configured to convert said character sequence to a second encoding format compatible with said platform independent IME.

6. The system of claim 5, wherein said platform independent IME is a Java-based Unicode IME, and said second encoding format is Unicode.

7. The system of claim 6, wherein said operating system-based IME service module is configured to call a Java IME character handling method via a Java Native Interface.

8. The system of claim 7, wherein said operating system-based IME service module is configured to run on an operating system service manager.

9. A system for accessing a platform independent input method editor (IME) from an underlying operating system, comprising:

an operating system based input means for receiving keystrokes from a user;

an operating system based means for forming a character sequence from the keystrokes, the character sequence being rendered as a desired character;

an operating system based means for receiving the character sequence formed from said keystrokes;

an operating system based means for calling said platform independent IME to convert said character sequence to a corresponding code point, the code point being a value assigned to the desired character in a specification of an encoding format; and an operating system based output means for outputting said code point.

10. The system of claim 9, wherein said operating system based input means comprises an active input control in an application running on said operating system.

11. The system of claim 10, further comprising an operating system based device driver means configured to form the character sequence from said keystrokes received from the user, and to transfer said character sequence to said operating system based IME service module.

12. The system of claim 11, wherein said operating system based device driver means is configured to convert said received keystrokes to a first encoding format suitable to editing said keystrokes at said active input control, and for forming said character sequence.

13. A computer program product for providing access to a platform independent input method editor (IME) from an underlying operating system, the computer program product comprising:

a non-transitory computer usable medium having computer readable program code means embodied in the medium, the program code means for providing access to a platform independent IME from an underlying operating system when executed by a processor, the computer readable program code means including:

computer readable program code means for receiving keystrokes at an operating system based input;

computer readable program codes means for forming a character sequence from received keystrokes, the character sequence being rendered as a desired character;

computer readable program code means for calling, from an operating system based IME service module, said platform independent IME to convert said character sequence to a corresponding code point, the code point being a value assigned to the desired character in a specification of an encoding format; and computer readable program code means for transferring said code point to an operating system based output.

14. The computer program product of claim 13, further comprising computer readable program code means for receiving said keystrokes at an active input control in an application associated with said operating system.

15. The computer program product of claim 14, further comprising computer readable program code means for converting said received keystroke to a first encoding format suitable for editing said keystrokes at said active input control, and for forming said character sequence.

16. The computer readable program product of claim 15, further comprising computer readable program code means for converting said character sequence to a second encoding format compatible with said platform independent IME.

* * * * *